United States Patent [19]
Jürgens et al.

[11] Patent Number: 5,152,190
[45] Date of Patent: Oct. 6, 1992

[54] TOOTHED-WHEEL CHANGE GEAR PUMP FOR CONVEYANCE AND A GEARBOX FOR TRANSMISSION OIL INTERMEDIATE STORAGE

[75] Inventors: Gunter Jürgens, Stuttgart; Jürgen Pickard, Wernau; Walter Roßmann, Stuttgart, all of Fed. Rep. of Germany

[73] Assignee: Mercedes-Benz AG, Fed. Rep. of Germany

[21] Appl. No.: 620,022

[22] Filed: Nov. 30, 1990

[30] Foreign Application Priority Data

Nov. 30, 1989 [DE] Fed. Rep. of Germany ....... 3939651

[51] Int. Cl.⁵ ............................................ F16H 57/02
[52] U.S. Cl. .................... 74/606 R; 475/59; 74/730.1
[58] Field of Search .............. 475/59, 70; 74/606 R, 74/730.1, 731.1, 732.1, 733.1

[56] References Cited

U.S. PATENT DOCUMENTS

| | | | |
|---|---|---|---|
| 3,416,393 | 12/1968 | Hattori | 475/61 |
| 3,537,553 | 11/1970 | Olsen | 475/61 X |
| 4,289,048 | 9/1981 | Mikel et al. | 74/733.1 |
| 4,586,401 | 3/1986 | Nogle | 475/62 X |
| 5,013,287 | 5/1991 | Hayakawa et al. | 475/61 |

FOREIGN PATENT DOCUMENTS 2939723 6/1980 Fed. Rep. of Germany .

Primary Examiner—Richard Lorence
Assistant Examiner—William O. Trousdell
Attorney, Agent, or Firm—Evenson, Wands, Edwards, Lenahan & McKeown

[57] ABSTRACT

In a toothed-wheel change gear, a gear pump for the conveyance of transmission oil is arranged in a separate gearbox chamber of a gearbox. Leakage oil flowing out at the gear pump is intermediately stored in the gearbox chamber in a controlled manner.

26 Claims, 1 Drawing Sheet

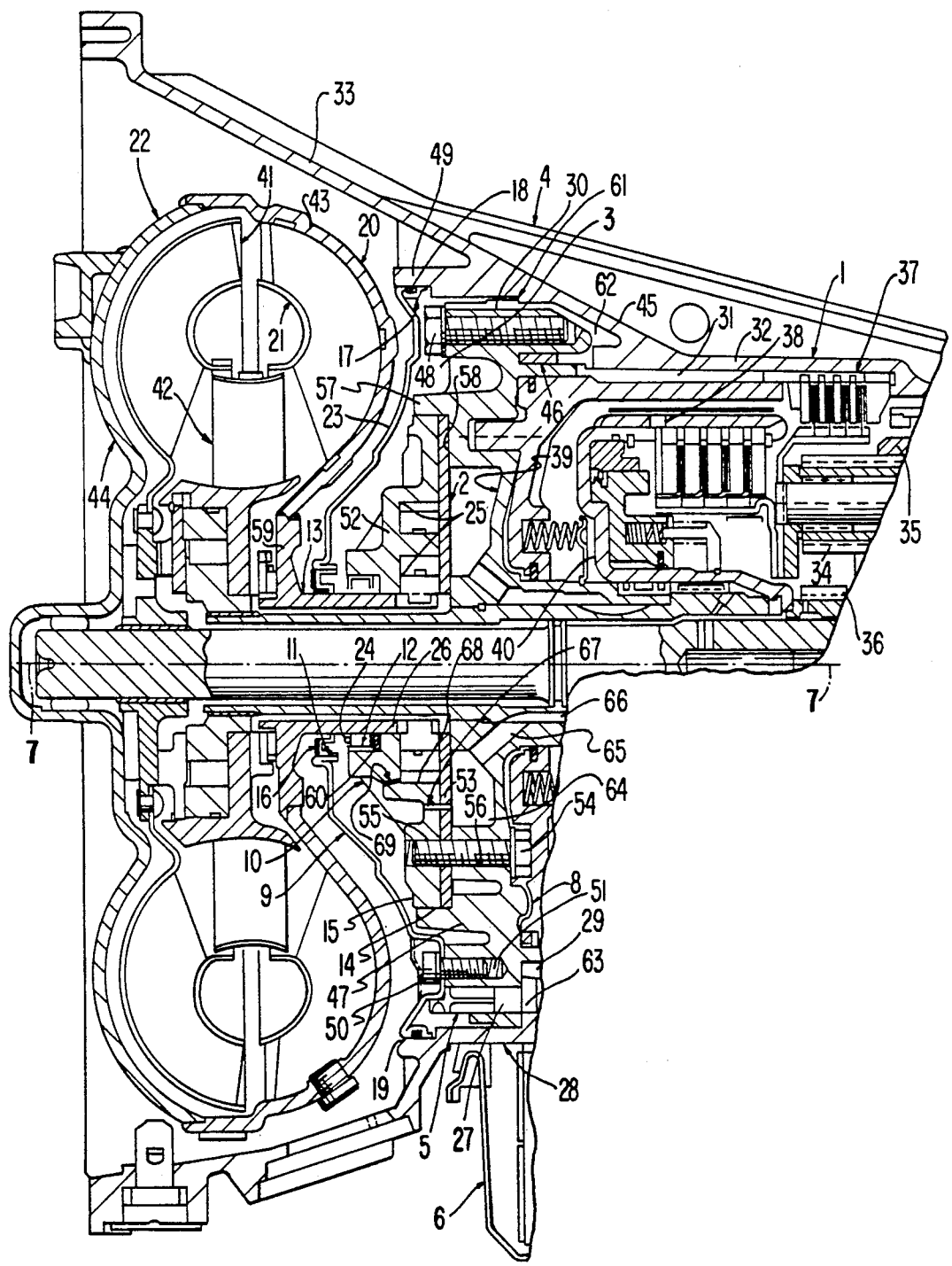

TOOTHED-WHEEL CHANGE GEAR PUMP FOR CONVEYANCE AND A GEARBOX FOR TRANSMISSION OIL INTERMEDIATE STORAGE

BACKGROUND AND SUMMARY OF THE INVENTION

The present invention relates to a toothed-wheel change gear and, more particularly, to a drive unit formed from an engine, a hydrodynamic torque converter and an automatically shifting toothed-wheel change gear in series with one another in terms of a force flux, with an arrangement for intermediate storage of transmission oil in a gearbox chamber and a gear pump for conveying the transmission oil being arranged in the gearbox chamber.

A toothed-wheel change gear is shown in German Patent Specification 2,939,723 and is arranged with its gear rotation axis, aligned with the axis of rotation of the driving half-shafts of a vehicle axle, parallel to the crankshaft axis and underneath the engine. The force flux from the engine to the gear takes place via a hydrodynamic torque converter flanged with its converter housing to the engine housing. The gearbox is made in one piece with the converter housing. A gearbox wall of the toothed-wheel change gear arranged on the side of the torque converter opposite the engine and located at the same height as the former and a closing cover designed as a pressed sheet-metal part enclose between them a gearbox chamber. In the lower region of the chamber there is at least one storage chamber divided off by retaining walls and intended for the intermediate storage of transmission oil. The middle region of this gearbox chamber receives a valve control housing and a gear pump for supplying pressure to the automatic shift device. The storage chamber is fed with a pressure-relieved oil return flow which comes out of the valve control housing and which is to a greater or lesser extent held back on its way to the lower oil sump by the thermostatic run-off control valve in order to prevent the oil level in the sump from rising as a result of the temperature-related increase in volume.

An object on which the present invention is based, in a drive unit in which an engine, a hydrodynamic torque converter and an automatically shifting toothed-wheel change gear are in series with one another, is essentially to allow a space-saving arrangement of a gearbox chamber for the temperature-dependent intermediate storage of transmission oil above the actual sump, from which the gear pump driven by the engine sucks up transmission oil.

Starting from a toothed-wheel change gear of a generally known type, that object has been achieved in an advantageous way by arranging the gearbox chamber in a constructional space between the converter and the change gear, with a closing cover being adjacent to the converter and the gear pump fastened via its casing to the side of the gearbox wall facing the closing cover. Both the closing cover and the pump casing of the gear pump each have a passage for a pump drive shaft aligned with the gear rotational axis. The pump casing has at least one orifice opening into the gearbox chamber such that the feed to the gearbox chamber is obtained by controlled outflow of leakage oil from the gear pump.

As a result of the present invention, the constructional space present between the converter and gear is used for the immediate storage and the primary pump necessary in any case is used for feeding the relevant gearbox chamber with leakage oil.

BRIEF DESCRIPTION OF THE DRAWING

These and other objects, features and advantages will become more readily apparent from the following detailed description of a presently preferred embodiment when taken conjunction with the accompanying sole figure which shows, in cross-section, an elevational view of a tooth-wheel change gear in accordance with the present invention.

DETAILED DESCRIPTION OF THE DRAWING

A gearbox 4 of an automatically shifting toothed-wheel change gear designated generally by the numeral 1 of the planet-wheel type has a middle cylindrical box portion 32 with a gearbox chamber 31 for receiving, among other things, planet wheels 34, central wheels 35 and 36, shift devices, such as shift brakes 37 and shift couplings 38, and associated pressure-activated shift actuators 39 and 40.

The box portion 32 of the gearbox 4 is followed by a bell-shaped box portion 33 for receiving a hydrodynamic torque converter 22, the working circuit of which contains a pump wheel 21, a turbine wheel 41 and a guide wheel 42. The outer contour 20 of the torque converter 22 is determined essentially by a toroidal outer shell 43. The shell 44 engages over the turbine wheel 41 and can be rotationally fixed in a conventional way to the crankshaft of an engine via an elastic drive disc in such a way that the axes of rotation of the crankshaft, of the torque converter 22 and of the toothed-wheel change gear 1 are aligned with a gear rotation axis 7—7.

The gearbox 4 has a gearbox wall 8 in the transitional region between its two box portions 32 and 33. The wall 8 extends perpendicular to the gear rotation axis 7—7 and divides off the gearbox chamber 31 from a second gearbox chamber 3 which is closed off, in the direction of the gear rotation axis 7—7 pointing toward the torque converter 22, by a sheet metal closing cover 9.

The gearbox wall 8 consists essentially of an annular flange 45 centrally disposed to the gear rotation axis 7—7 and made in one piece with the casing of the gearbox 4. The wall 8 has a mounting orifice 46 for the introduction of the toothed wheels, etc. For closing the mounting orifice 46, the gearbox wall 8 has a corresponding disc-shaped wall part 47 which is clamped to the annular flange 45 by fastening screws 48.

The annular flange 45 has a central extension 49 which is of wider diameter than the disc-shaped wall part 47 and which projects beyond the disc-shaped wall part 47 in the direction of axis 7—7 toward the torque converter 22. The closing cover 9 is centered and sealed off by its outer edge in relation to this extension 49. For this purpose, the closing cover 9 has a beading 17, into which is rolled a receiving groove 18 and in which an annular gasket 19 pressing against the extension 49 is inserted. The closing cover 9 is secured by fastening screws 50 which are screwed into corresponding threaded bores 51 of the disc-shaped wall part 47.

The closing cover 9 has a toroidal form 23 which is geometrically similar to the toroidal form 20 of the outer shell 43 of the adjacent pump wheel 21 and which thus matches (or complements) the outer shell 43.

A gear pump 2 is arranged in the gearbox chamber 3. A pump casing 10 of the pump 2 consists of a plateshaped casing part 52 receiving the toothed wheels and of a casing side wall 53 closing off the interior. The disc-shaped wall part 47 of the gearbox wall 8 is equipped with screw passages 56 for fastening screws 54 which are screwed into threaded bores 55 of the casing part 52 and which thus clamp the pump casing 10 fixedly in terms of movement against a receiving surface 58 located in the gearbox chamber 3 and belonging to the disc-shaped box part 47. The receiving surface 58 is axially inset relative to a central annular extension 57 of the disc-shaped box part 47 in the direction of the gear rotation axis 7—7 pointing away from the torque converter 22. The pump casing 10 is centered and sealed off relative to this extension 57. Only corresponding casing surfaces 14 and 15 are used for the sealing in order to obtain a controlled outflow of leakage oil from the gear pump 2 for feeding the gearbox chamber 3 with transmission oil between these casing surfaces.

In its radially inner region, the pump wheel 21 or its outer shell 43 is welded to a hum 59 which is in one piece with a pump drive shaft 13 designed as a hollow shaft. The pump drive shaft 13 is arranged coaxially relative to the gear rotation axis 7—7 and passes through an appropriate central passage 11, 12 of the closing cover 9 and of the pump-casing part 52, respectively. A shaft seal 16 inserted into the passage 11 seals off the pump drive shaft 13 relative to the closing cover 9. The pump drive shaft 13 is supported relative to the pump casing 10 by a rolling bearing 24 which is inserted into the passage 12 and which is divided off from the casing interior 25 of the pump casing 10 by a narrow annular gap 26, but is open relative to the gearbox chamber 3. The annular gap 26 is calculated so that a controlled outflow of leakage oil from the gear pump 2 via the rolling bearing 24 into the gearbox chamber 3 becomes possible, while at the same time, a throttle ring 60 for limiting the quantity of leakage oil can be inserted between the annular gap 26 and rolling bearing 24.

The gearbox chamber 3, in its uppermost region, has an overflow connection 61 to the other gearbox chamber 31 which is composed of a groove-shaped axial indentation 30 open to the gearbox chamber 3 and located on the outer edge of the disc-shaped wall part 47 and of an aligned box channel 62 open to the gearbox chamber 31 and located in the annular flange 45. The gearbox chamber 31 is open relative to a sump 6.

A run-off channel 27 in the disc-shaped wall part 47 extends from the lowest region of the gearbox chamber 3 located level with the bottom 29 of the gearbox 4 and communicates with an orifice 63 located in the box bottom 29 and open to the interior of the sump 6 which is secured to the underside 28 of the box bottom 29 in the usual way and from which the gear pump 2 sucks up oil.

The quantity of oil flowing off via the run-off channel 27 into the sump 6 is adjusted by a thermostatic run-off control valve 5 which operates as a function of the oil temperature and which is described in terms of its functioning and configuration in German Patent Application P 39 21 932.1-12. The valve 5 is slidably movable to change the effective opening of the run-off channel by a bimetallic spring exposed to the oil temperature.

A pump chamber 68, under feed pressure, of the gear pump 2 is connected to the gearbox chamber 3 by a throttle channel 69 of the pump casing 10 in order to obtain leakage oil for intermediate storage in a controlled way.

The gear pump 2 conveys into a main-pressure line of the gear control in which a constant main pressure is set in the conventional way by a special main-pressure regulating valve, from which the lubricating-pressure line of the gear pressure lubrication also extends and is supplied with transmission oil for the lubrication. Arranged in series in this lubricating-pressure line, starting from the main-pressure regulating valve, are the torque converter 22, an oil cooler, a box chamber 64 of the gearbox wall 8, box channels 65 extending from the latter and leading to the lubricating points of the gear and adjoining box channels 66. The above-described lubricating-pressure system is described in "Funktionsbeschreibung automatische Getriebe" ["Functional description of automatic gear transmissions"], Daimler-Benz-Aktiengesellschaft, Stuttgartp Untertürkheim, Nov. 1985, No. 65 10 10 37 00, pages 41 and 42.

The pump casing 10 has a throttle channel 67 which makes a direct connection between the box chamber 64 of the pressure lubrication and the gearbox chamber 3 for intermediate storage in order to control the introduction of leakage oil into the chamber 3. The throttle cross section of the throttle changes 67 and 69 is approximately 0.8 mm.

The following leakage paths can thus serve for introducing leakage oil into the gearbox chamber 3: (a) the annular gap at the outer circumference of the pump-casing parts 52 and 53; (b) the annular gap 26; (c) the throttle channel 67; and/or (d) the throttle channel 69. One, several or all of these leakage paths can be provided.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a drive united formed from an engine, hydrodynamic torque converter and automatically shifting toothed-wheel change gear in force flux series with one another an arrangement comprising a gearbox chamber above a transmission for the temperature-dependent intermediate storage of transmission oil and limited by a gearbox wall arranged perpendicular to a horizontal gear rotation axis and by a pressed sheet metal closing cover located opposite this wall, a gear pump for conveying the transmission oil arranged in the gearbox chamber, a thermostatic run-off control valve operative as a function of the temperature of the transmission for controlling oil run-off from the gearbox chamber into the sump, wherein the gearbox chamber is arranged in a space between the converter and the gear, the closing cover is adjacent the converter, the gear pump has a casing fastened to a side of the gearbox wall facing the closing cover, both the closing cover and the pump casing of the gear pump each have a passage for a pump drive shaft aligned with the gear rotation axis, and the pump casing has at least one orifice opening into the gearbox chamber such that the feed to the gearbox chamber is obtained by a controlled outflow of leakage oil from the gear pump.

2. The arrangement according to claim 1, wherein the closing cover is of substantially rotationally symmetrical design.

3. The arrangement according to claim 1, wherein only casing surfaces of the pump casing sealing directly relative to one another are used for sealing off the pump casing from the gearbox wall.

4. The arrangement according to claim 1, wherein the closing cover is of substantially rotationally symmetrical design.

5. The arrangement according to claim 1, wherein a shaft seal is inserted into the passage of the closing cover.

6. The arrangement according to claim 5, wherein the closing cover is of substantially rotationally symmetrical design.

7. The arrangement according to claim 6, wherein only casing surfaces of the pump casing sealing directly relative to one another are used for sealing off the pump casing from the gearbox wall.

8. The arrangement according to claim 1, wherein an outer edge of the closing cover has a collar-shaped beading with a rolled-in receiving groove for an annular gasket for sealing off relative to the circumferential wall of the gearbox chamber.

9. The arrangement according to claim 8, wherein the closing cover is of substantially rotationally symmetrical design.

10. The arrangement according to claim 9, wherein only casing surfaces of the pump casing sealing directly relative to one another are used for sealing off the pump casing from the gearbox wall.

11. The arrangement according to claim 10, wherein a shaft seal is inserted into the passage of the closing cover.

12. The arrangement according to claim 1, wherein the closing cover has a form matching an outer contour of the torque converter adjacent therein.

13. The arrangement according to claim 12, wherein the closing cover is of substantially rotationally symmetrical design.

14. The arrangement according to claim 13, wherein only casing surfaces of the pump casing sealing directly relative to one another are used for sealing off the pump casing from the gearbox wall.

15. The arrangement according to claim 14, wherein a shaft seal is inserted into the passage of the closing cover.

16. The arrangement according to claim 15, wherein an outer edge of the closing cover has a collar-shaped beading with a rolled-in receiving groove for an annular gasket for sealing off relative to the circumferential wall of the gearbox chamber.

17. The arrangement according to claim 1, wherein a roller bearing supports the pump drive shaft in the pump casing the roller bearing being closed off from an interior of the pump-casing, with the exception of an annular gap between the pump drive shaft and the corresponding passage of the pump casing, and is open to the gearbox chamber.

18. The arrangement according to claim 17, wherein the closing cover is of substantially rotationally symmetrical design.

19. The arrangement according to claim 18, wherein only casing surfaces of the pump casing sealing directly relative to one another are used for sealing off the pump casing from the gearbox wall.

20. The arrangement according to claim 19, wherein a shaft seal is inserted into the passage of the closing cover.

21. The arrangement according to claim 20, wherein an outer edge of the closing cover has a collar-shaped beading with a rolled-in receiving groove for an annular gasket for sealing off relative to the circumferential wall of the gearbox chamber.

22. The arrangement according to claim 21, wherein the closing cover has a form matching an outer contour of the torque converter adjacent therein.

23. The arrangement according to claim 17, wherein the annular gap is configures to allow a controlled outflow of leakage oil.

24. The arrangement according to claim 1, wherein the gearbox wall has an overflow channel which extends from an uppermost region of the gearbox chamber and which opens into a further gearbox chamber of a gearbox.

25. The arrangement according to claim 1, wherein the pump casing has a throttle channel which connects a box chamber of the gearbox wall connected to a pressure lubrication means to the gearbox chamber for the intermediate storage.

26. The arrangement according to claim 1, wherein the pump casing has a throttle channel which connects a pump chamber under feed pressure to the gearbox chamber for the intermediate storage.

* * * * *